Nov. 2, 1965  J. D. RIESER  3,214,997

VARIABLE SPEED TRANSMISSION

Filed Nov. 27, 1961  4 Sheets-Sheet 1

INVENTOR.
John D. Rieser
BY

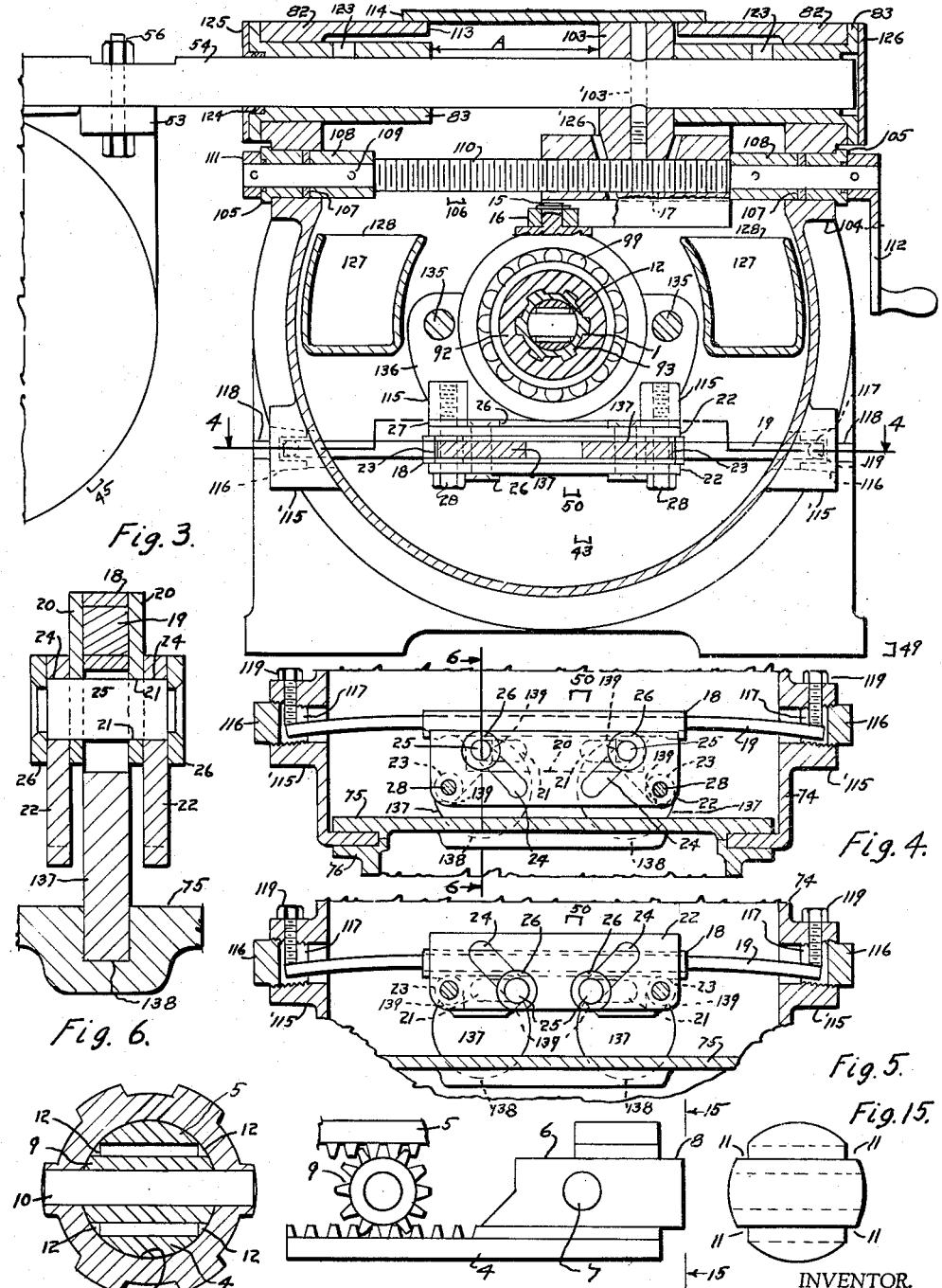

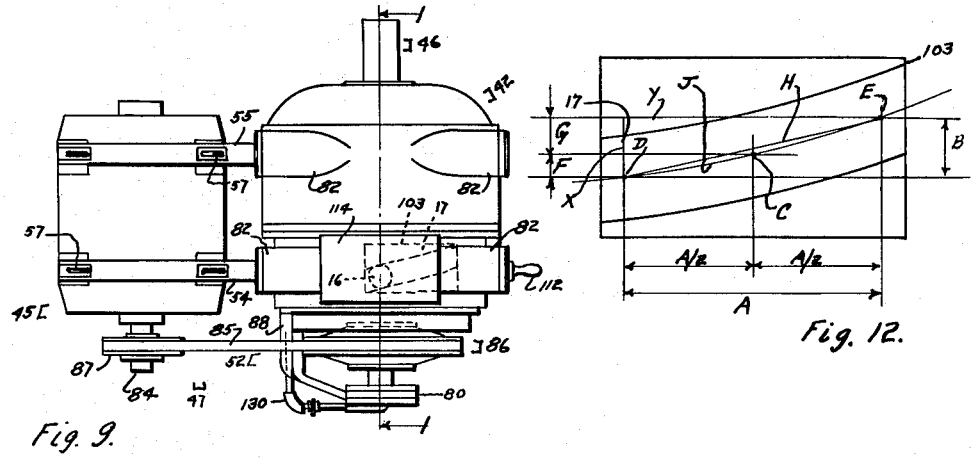

United States Patent Office 3,214,997
Patented Nov. 2, 1965

3,214,997
VARIABLE SPEED TRANSMISSION
John D. Rieser, 693 Mission St., San Francisco, Calif.
Filed Nov. 27, 1961, Ser. No. 156,557
12 Claims. (Cl. 74—640)

This invention relates to a self-contained variable speed transmission, more particularly to a V belt variable speed drive including a housing having an extendible mounting means for a driver motor having an output shaft mounting a V grooved pulley structure and in parallel relationship the housing operably mounting a driven shaft cooperatively mounting a variable effective diameter V groove pulley with an endless V belt in driving relationship thereto to transmit power from one shaft to the other shaft to provide of variable speed situations at the driven shaft. The variable effective diameter pulley, formed of a pair of sections having opposed inclined belt engaging faces and forming, by axial adjustment variable effective diameter to vary the drive ratio and correlatively vary the spacing between the two shafts while maintaining said driving relationship, by a control means operably mounted within the housing and having externally an actuating means. And the driven shaft including means for rigidly securing thereto either a desired power takeoff or a power input shaft of a speed change gearing having a power takeoff extending from one end of the housing.

In the present instance, the driver motor is mounted onto a pair of extendible arms and its output shaft mounts a V grooved pulley of fixed effective diameter, which is connected by a V belt with the effective diameter of a variable effective diameter pulley on the driven shaft or load driving shaft. And this variable effective diameter pulley includes a pair of sections having opposed inclined faces which are axially adjustable toward or away from each other, in that as the sections move together, the belt in active driving relationship with both of the inclined faces, is moved by the sections radially outwardly, thereby increasing the effective diameter, and reversely as the sections move away from each other, the belt in active driving relationship with both inclined faces, moves radially inwardly, thereby decreasing the effective diameter. These axial adjustments are effected by the control means and correlatively the control means effects change in the spacing between the driven shaft and the motor, thereby maintaining the active driving relationship of the V belt therewith the pulleys through entire range of speed adjustments.

In my prior Patent 2,573,493, dated October 30, 1951, I have disclosed a similar variable ratio transmission mechanism. However, it does not include a self-contained unity and other novel features of the present invention.

An object of the present invention is to provide an improved variable speed transmission of the character, wherein only one of a pair of pulleys drivingly connected by a V belt having its effective diameter adjustable correlatively with that of the spacing between the shaft mounting the driver and driven pulley structures and having a housing with operable mounting base means and other facilities to provide forming a complete self-contained variable speed transmission.

Another object of the present invention is to provide in the above, wherein the housing includes an enclosure with a fluid lubricant therein, for lubricant wetting of the metal to metal actuating parts within the enclosure and metal to metal actuating parts of the variable effective diameter pulley disposed externally of the enclosure by a fluid lifter means operably mounted onto an end portion of the driven shaft that extends into the enclosure.

Another object of the present invention is to provide of the housing in the foregoing, having an extension beyond one end, and of which the outward end of the extension supportably mounts a bearing for the driven shaft that in turn extends into the enclosure, wherein supportably mounts another support bearing for this driven shaft. And intermediate of these two bearings the driven shaft operably mounts a variable effective diameter V pulley externally of the enclosure and of which the longitudinal portion of the extension is disposed within the inner circumference of the endless V belt, thereby providing of placement and removal of the endless V belt without dismantling any portion of the transmission.

Another object of the present invention is to provide in the above characterized variable speed transmission, that the housing includes suitable mounting means for a pair of extendible arms projecting beyond a side of the housing for supportably mounting a driver motor in parallel alignment to the driven shaft.

Another object of the present invention is to provide in the above characterized variable speed transmission that the mechanical control means to effect adjustment of the effective diameter of the variable V groove pulley is operably connected to at least one of the arms that mounts the driver motor in manner to substantially effect a correlative change between that of the effective diameter and the spacing distance between the driven shaft which mounts the variable effective diameter V groove pulley and the driver motor output shaft and to maintain a constant driving relationship of the belt and pulleys throughout entire range of speed adjustments.

Another object of the present invention is to provide in the above characterized variable speed transmission a thruster means that provides a thrust force of substantially constant amount through entire range of speed adjustments in a direction opposite to that of the operative wedging action of the V belt, at the adjustable diameter pulley, and thereby avert desired amount of these V belt wedging forces acting onto the control mechanism, also it provides a means of the drive being rated constant horsepower throughout entire range of speed adjustments.

Another object of the present invention is to provide that the foregoing thruster means together with the V belt forms a portion of the control means for effecting changes of the speed ratio.

This invention possesses other advantages and has other objects which may be more clearly apparent from consideration of the several embodiments of the invention. For this purpose there are outlined several forms. These forms will now be described in detail to illustrate the general principle of the invention, but it is to be understood that this detailed description is not to be taken in a limiting sense as same is susceptible of modification without departing from the spirit or scope of the invention which is broadly set forth in the appended claims.

In the accompany drawings:

FIGURE 1 is an elevation side view partly in section taken generally on the line 1—1, FIGURE 9, with speed change gearing within the housing, and with the variable effective diameter pulley adjusted for low speed operation of the unit.

FIGURE 2 is an elevation side view partly in section similar to that of FIGURE 1, but without the inclusion of speed change gearing within the housing, which has been replaced and shows the couple application of the power takeoff shaft within the inclosure while its other end extends beyond one end of the housing. Also shows the variable effective diameter pulley adjusted for high speed operation of the unit.

FIGURE 3 is a cross-section view partly in section taken generally on the staggered line 3—3, FIGURE 1.

FIGURE 4 is a cross-section view partly in section taken on the line 4—4, FIGURE 3, to show in plan the thruster means when the variable speed transmission is adjusted to its low speed adjustment.

FIGURE 5 is a cross-section view partly in section similar to that of the FIGURE 4, but with the variable speed transmission adjusted to its high speed adjustment.

FIGURE 6 is a cross-section view to enlarged scale partly in section taken on the line 6—6, FIGURE 4.

FIGURE 7 is an end elevation view to reduced scale of the variable speed transmission when adjusted to its low speed adjustment.

FIGURE 8 is a side elevation view of the FIGURE 7.

FIGURE 9 is a top plan view of the unit of FIGURE 7.

FIGURE 10 is an end elevation view similar to that of the FIGURE 7, but with the variable speed transmission adjusted to its high speed adjustment.

FIGURE 11 is an enlarged fragmentary plan view partly in section and broken away but showing the inclosed channel means leading from within the housing to and into the outward end of the driven shaft, taken generally on the line 11—11, FIGURE 7.

FIGURE 12 is an enlarged plan view of the groove for controlling the effective diameter of the variable effective diameter V groove pulley taken apart from the transmission, FIGURE 9.

FIGURE 13 is an enlarged cross-section through the driven shaft at the pinion gear to show the relationship between the diameter of pinion gear shaft and the width of the drive splines. Also showing an end view of the group of four fluid channels at the face of the bore within the shaft.

FIGURE 14 is an enlarged side view of the rack members in mesh oppositely with the pinion gear, taken apart from the shaft, FIGURE 13; it also shows the extension at the right end on one of the racks.

FIGURE 15 is an end view of the rack having the extension taken on the line 15—15, FIGURE 14.

Figure 1:
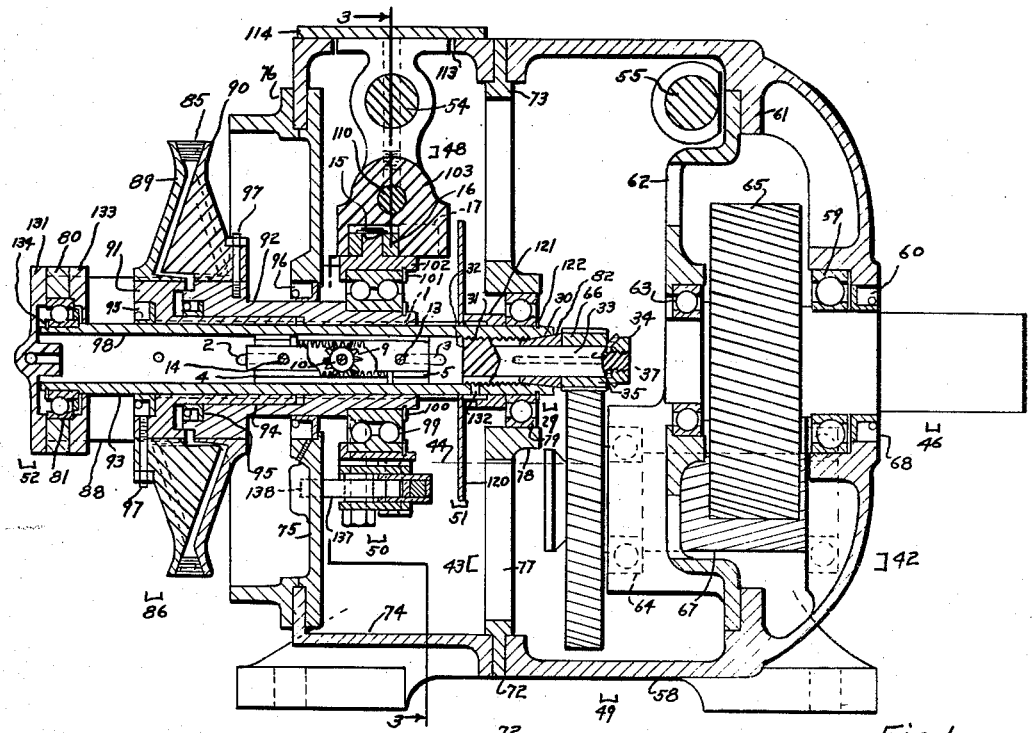

Referring to the drawings, and more particularly to FIGURES 1, 2, 3, 7 and 11, the variable speed transmission or unit is generally formed of a housing 42 having base members 49 for operative mounting of the entire unit, and the housing 42 providing a fluid inclosure 43, with a fluid lubricant 44 therein, a driver motor 45, a variable speed power takeoff shaft 46, and the variable ratio mechanism 47 disposed externally of the inclosure 43, of which the numeral 48 indicates generally the mechanical control means, the thruster means 50, the extension element 52 and the automatic continual lubrication system 51. The variable ratio mechanism 47 providing a variable speed drive between the motor 45 and the variable speed power takeoff shaft 46.

The motor 45, FIGURES 3, 7, 9 and 10, having desired electrical characteristics and regular mounting feet 53 that are bolted by bolts or the like 56 onto the under side of the extendible pair of arms 54 and 55 in regular manner, which forms support means for the motor. And of which this pair of arms have the slotted holes 57 (best seen at FIGURE 9) which allows for the motor being shifted toward or away from the housing 42 and thereby provide slackness for installing the endless V belt 85 and reversely provide of desired driving tension.

Figure 2:
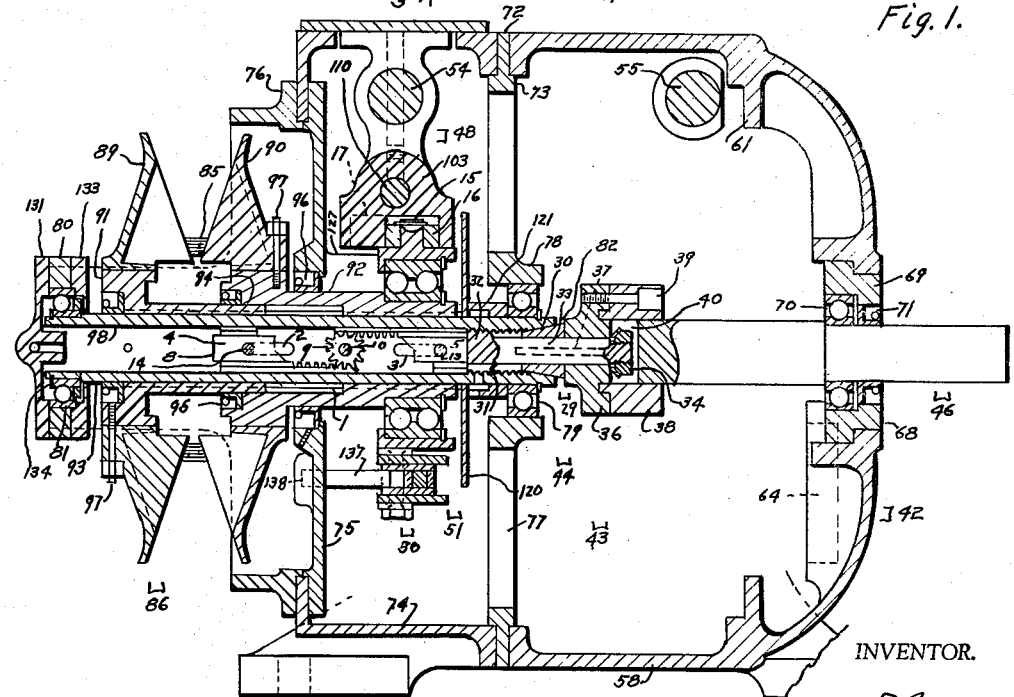

As shown in FIGURES 1 and 2, the housing 42 is formed of a rearward section 58 having an opening 68 for mounting the power takeoff shaft bearing 59 and seal 60, and adjacent thereto inwardly the housing has a flange means 61 for fastening thereto in suitable manner the spider 62, which supports the other bearing 63 for the power takeoff shaft 46 and this spider and rearward section also provides for bearings of the intermediate gearing generally indicated by dotted lines numbered 64 when speed change gearing is required, of which 65 is the final gear and 66 is the first pinion gear, while 67 indicates generally the intermediate gearing of a desired gear train, as had been indicated by the FIGURE 1. And when the unit is to be employed without gearing as shown by the FIGURE 2, into the opening 68 is fastened the adaptor 69 which supports the bearing 70 and seal 71 for the power takeoff shaft 46, here shown and hereafter described. Then the opposite end 72 of the rearward section 58 is suitably fitted for fastening thereto, fluidtight, the adaptor ring 73 and corresponding end of the forward section 74 (the fastenings are not shown). The opposite end of the forward section 74 internally is suitably fitted for fastening thereto, fluidtight, the seal adaptor 75 and the ring flange 76 of the extension element 52 (hereinafter described). The adaptor ring 73 has openings 77 for communication passage of the fluid lubricant 44 within the inclosure 43, thusly forming a continuous pool. Then as an addition the adaptor ring 73 has the hub 78 for mounting the bearing 79, and additionally the extension element 52 has the hub 80 for mounting the bearing 81. The bearing 79 disposed within the inclosure 43 and the bearing 81 disposed beyond the inclosure 43 forming journal support for the driven or variable speed shaft 93, hereinafter described.

Now referring to the FIGURES 3, 7, 9 and 10, at an upper portion of the housing 42 are a series of bosses 82 that have bores extending rectangularly to the axis of the driven shaft 93 for the bushings 83, which in turn are bored slidably fit for the extendible arms 54 and 55, heretofore mentioned providing support means for the driver motor 45, and in turn these arms are operably supported entirely by the housing 42, as the inward portion extends into the inclosure 43 and having an outward portion projecting beyond a side of the housing 42, and thereby provide of the motor output shaft 84 being disposed parallel to the axis of the driven shaft 93, also as will be seen, provide of adjusting of the spacing between the output shaft 84 and the driven shaft 93. The motor output shaft 84 mounts an ordinary V grooved pulley 87 and the driven shaft 93 outwardly beyond the housing 42 but, intermediate of the bearings 79 and 81 mounts the variable effective diameter pulley generally indicated by the numeral 86 (hereinafter described) and the endless V belt 85 is in driving relationship to the V grooved pulley 87 and the effective diameter of the variable pulley 86, to transmit power from the motor to the variable speed or driven shaft 93. And in which the extension element 52 in addition to the ring flange 76, heretofore mentioned, includes a neck 88 that extends from the housing 42 in a parallel direction to that of the shaft 93, and at its outward end terminates at the hub 80, and provides support for the outboardly disposed bearing 81. And of which the neck 88 (best seen at the FIGURES 7, 9 and 11) always extends within the inner circumference of the endless V belt 85, which provides of the endless V belt being removed or placed while retaining in its entirety the driven shaft journal supports and other novel features, as will be seen. For illustrative purposes let it be assumed that it is desired to remove the endless V belt 85 from the unit, FIGURE 7. The bolts 56 are loosened slightly which allows of the motor 45 being shifted toward the housing 42, that in turn provides sufficient slack, so that the belt can be shifted over the rim of the adjustable pulley by hand, and since the extension element 52 has its neck 88 together with the outboard bearing 81 within the inner circumference of the endless V belt 85, this portion of the belt is shifted over the end of the extension portion 80 and then the other portion of the belt is lifted from the V grooved pulley 87, and in a reverse manner a new endless V belt is installed, and after the belt has been placed into the respective V groove of both pulleys, the motor is shifted away from the housing to obtain desired belt tension matters, whereupon the bolts 56 are retightened.

The variable effective diameter pulley 86 is similar to those shown by my Patent 2,970,493, dated February 7, 1961; however, its control means 48, as will be seen, involves new features. In FIGURES 1 and 2, the adjustable effective diameter pulley 86 is formed of a relatively axial adjustable pair of pulley sections 89 and 90 having opposed inclined belt engaging faces for engaging opposite sides of the V belt 85 throughout the relative adjustable range. The section 89 includes its hub 91 while the section 90 has the hub 92, each of these hubs 91 and 92 are slidably mounted onto the variable speed or driven shaft 93 and having telescopic engagement relative to one another, as at 94, while this end of the hub 92 includes the positive seal 95 slidably sealing and engaging the telescopic surface of the hub 91. And the other end portion of the hub 92 extends into the inclosure 43 with an external surface slidably engaging the seal 96 that is mounted within the seal adaptor 75. The sections 89 and 90 are fixedly secured onto their respective hubs as shown by the studs 97 and thereby forming an individual structure in each instance. And the drive means 1, drivingly connecting these structures and the driven shaft 93, is formed of external splines of suitable length on the drive shaft 93, so that a part of the drive means 1 is always disposed within the inclosure 43, as internally the hugs 91 and 92 having cooperative spline means, best seen at the FIGURE 3. The driven shaft 93 is of tubular form and has a first pair of slots 2 and spaced axially therefrom a second pair of slots 3, that extend through the walls of the driven shaft 93 and thereby providing passages to the interior of this shaft to provide for a portion of the lubricant fluid 44 effecting lubrication wetting of the surfaces of the drive means 1, as will be hereinafter described. The driven shaft 93 has a bore 98 that extends to and beyond the second pair of slots 3 for operable engagement corresponding surfaces of a first rack 4 and a second rack 5 and their head portions. The racks 4 and 5 each having gear teeth beyond their heads, and each of the heads includes externally a plane surface 6 and internally a hole 7 extending through the heads in alignment to the axis of the gear teeth. Both racks 4 and 5 are alike with the exception that the rack 4 had an extension 8 at its head for purpose of providing a partial closure of the first pair of slots on the entering side of the fluid lubricant, as will be seen, best seen at the FIGURES 14 and 15. Within the bore 98, the racks 4 and 5 are arranged in pair with their respective gear teeth in mesh oppositely with a pinion gear 9, that is journally mounted by its shaft pin 10, that is attached fixedly in the walls of the bore 98 intermediate of, but in alignment to the pairs of slots 2 and 3, best seen at the FIGURES 13 and 14. The pinion gear 9 has a hub at each end, and these ends are of spherical form, of diameter to substantially correspond with the diameter of the bore 98, and so provide for bearing area between these ends and the bore 98. The racks 4 and 5 each have a series of notches 11, disposed to correspond with the diameter and length of the hub at each head so that when the racks and pinion are in place within the shaft, bore 98 provides a series of four channels 12, extending from opposite ends of the heads, but spaced from the slots 2 and 3 that form passages on the circumference of the bore 98, and thusly provide fluid channels within the bore, as will be seen.

A pin 13 extends radially through the walls of the hub 92; also this pin 13 passes through the pair of slots 3 and the hole 7, and forms a rigid joining of the rack 5 therewith the hub 92, so that upon causing an axial adjustment of the hub 92 moves axially a like amount of the rack 5. While a pin 14 extends radially through the walls of the hub 91, also this pin 14 passes through the pair of slots 2 and hole 7, and forms a rigid joining of the rack 4 therewith the hub 91. So that upon effecting the foregoing axial adjustment and corresponding axial movement of the rack 5, which causes a rotative actuation of the pinion gear 9, which due to the opposite disposed rack 4, simultaneously causes a similar axial movement of the rack 4 oppositely, whereby causing the sections 89 and 90 to move controllably toward or away from one another, thereby controlling the effective diameter of the pulley 86, for it forms an operable linkage means extending between portions of the control means 48, that is disposed within the inclosure 43, hereinafter described.

At the FIGURE 1, the pulley 86 is shown adjusted to its maximum effective diameter, while at the FIGURE 2, this pulley 86 is shown adjusted at its minimum effective diameter. And it is to be observed that throughout the range of variable effective diameter adjustments or axial adjustments of the sections 89 and 90 the edges of the pins 13 always remain within the inclosure 43. Also throughout a corresponding range of the telescopic engagement 94, the edges of the pins 14, always remain therein, thereby maintaining the respective slidable sealing contacts of the seals 95 and 96 therewith the respective surfaces at the hubs 91 and 92. And with reference to the shaft pin 10, has an external diameter surface of uniform diameter, and it extends through an oppositely disposed pair of external splines 1, having a width whereby the pin 10 remains within range of their spline width, without interference of the slidable movement between the respective drive, components.

Then within the inclosure 43 is the thrust bearing 99 of the double row preloaded variety, with its inner race anchored fixedly between a shoulder and the snap ring 100 onto an end of the hub 92, and with its outer race anchored fixedly between a shoulder and the snap ring 101 within the holder 102. While externally the holder 102 includes the shaft 15, that operably mounts the control roller 16, thereby forming a single structure, whereupon causing of an axial movement of the control roller 16, toward or away from the V belt causes, due to the operably attached linkage means hereinabove dealt with, a corresponding axial adjustment of the sections 89 and 90, with consequent change of the effective diameter of the pulley 86. And, as will be seen, such axial movement causing change of the effective diameter of the pulley 86, the control means 48 also simultaneously causes a correlative change of the spacing between the shaft 93 and the motor shaft 84, both in a controlled positive manner by the control nut member 103 and its inclined curved groove 17.

Now referring to the FIGURES 3, 8 and 9, below the arm 54 at each side of the housing 42, includes the bosses 104 into which are fitted the flanged bearing bushings 105, that in turn are suitable fastened to the bosses 104 (the fastenings are not shown) and these bushings are bored for opposite end portions of the lead screw, generally indicated by the numeral 106, and the inside end of the bushings 105 abut the thrust washer 107, and in turn the opposite end of these thrust washers abut the sleeves 108, that are fastened to the lead screw, as by the pins 109, and intermediate of the sleeves, the lead screw has the external screw threads 110, and at one outside end of the lead screw 106 is a shaft collar 111, while at its opposite end is suitable fastened a crank 112 or any other suitable actuator means, in that, the lead screw 106 be rotated while being retained of movement in an axial direction. The control nut member 103 includes internal screw threads for threadingly connecting therewith the lead screw 106. Then above the lead screw 106, the control nut member 103 is rigidly secured to the arm 54, as by a pin 103' or any other suitable rigid connection, so that upon rotation of the lead screw 106, due to the screw threaded connection therewith the nut, causes the control nut 103 together with the arm 54 to move in a rectangular direction relative to the axis of the driven shaft 93 toward or away from the housing 42 and simultaneously causes the sections 89 and 90 to move axially toward or away from the center of the V belt a correlative amount, due to the inclined curved groove 17 of the control nut member 103 in which the control roller 16 rides, while maintaining the driving relationship of the V belt therewith the respective pulleys through entire range of speed ratio changes, as will be seen.

Referring to the FIGURE 12, which is an enlarged plan view of bottom face of the control nut member 103 and shows a plan view of its inclined curved groove 17 apart from the unit. Of which the curved pitch line J, which is an arc of a true circle, and it represents the pitch diameter of the groove 17, also represents the axis center of the control roller 16 (not here shown) upon causing movement of the nut member the arrowed distance A which represents the transverse movement range of the nut member, also represents the change of the center distance between the motor shaft and the driven shaft, when changing the speed ratio, FIGURE 7, to that of the FIGURE 10, which distance change is also represented by the arrowed distance A, as is also the distance of movement of the nut member at the FIGURE 3. And of which the arrowed distance A/2 represents one-half the transverse movement range A. While the arrowed distance B represents the inclination range of the curved pitch line J, also it represents the axial adjustment range or axial adjustable distance of the control roller 16 and the sections 89 and 90 of the variable effective diameter pulley 86.

The pulley 86, FIGURES 1 and 7, is shown adjusted to its maximum effective diameter and with reference to the FIGURE 12, the center of the control roller is at the point D. And with reference to the FIGURES 2 and 10 the pulley 86 is shown adjusted to its minimum effective diameter and correspondingly with reference to the FIGURE 12, the center of the control roller riding within the groove 17, is at the point E. Again to the FIGURE 1, let it be assumed that the lead screw 106 be actuated so that the nut member with the inclined curved groove 17, is caused to move the arrowed distance A/2, FIGURE 12, which causes the control roller 16 in the groove 17, to move axially the distance represented by the arrowed distance F, to the mid point C and simultaneously causes change of the center distance between the two shafts one-half of the total arrowed distance A or A/2. Then let it be further assumed a continuation of the actuator, lead screw 106 so that the nut member 103 with its included curved groove 17, is caused to move transversely the balance or other half arrowed distance A/2, FIGURE 12, which causes the control roller 16 in the groove 17 to move axially the distance represented by the arrowed distance G to the position E. It is to be observed that the axial adjusted distance F is less than that of the axial adjusted distance G, which is correct to maintain the driving relationship of the V belt therewith the pulleys 86 and 87, for the valid reason, that amount of change of the effective diameter between the points D and C is less than the amount of change of the effective diameter between the points C and E, while correlatively compensating for the simultaneous corresponding change of the center spacing between the respective shafts, and consequent change of the tangential portion of the V belt 85.

Again referring to the FIGURE 12, have found that in constructing a right triangle formed by the axial movement distance B, line X and the transverse movement distance A, line Y and a line H connecting the points D and E forms the hypotenuse of such triangle, in which the length of the distance of H constitutes the chord of the segment or arc of the pitch diameter of the inclined curved pitch line J of the groove 17 in the nut member 103, and of which the mid point C provides the third point for computing the pitch diameter of the curved groove, which provides of a like pitch path length about the pitch diameters of the respective pulleys and the tangential distance therebetween through entire range of speed ratio changes or speed adjustments.

The FIGURE 9 shows by means of dotted lines the control nut 103 with its inclined curved groove 17, with the control roller 16 riding therein. The inclination of the curved groove 17 covers the unit as shown with the driver motor 45 disposed to the left of the housing 42. This development provides that the unit be assembled so that the motor be disposed at the opposite side; however, this requires that the control nut groove be inclined oppositely, and for this purpose, provide the opening or aperture 113 (best seen at the FIGURES 1 and 3) at top of the housing 42 through which change of the control nut be effected, and to provide closure of the inclosure 43 provide the cover 114, which is suitably fastened onto the housing, the fastenings are not shown.

The operative wedging action of the V belt 85, at the variable effective diameter pulley 86, results in a thrust force onto the respective wall of the inclined curved groove 17 of the nut member 103 through the control roller 16, and to relieve these wedging action thrust forces acting onto various surfaces of the control means, have developed the thruster generally indicated by the numeral 50. And the thruster 50 provides a thrust force acting in direction opposite to that produced by the wedging action of the V belt; also in which its thrust force remain substantially constant through the entire range of speed changes of the unit. As will be seen, the constant amount or magnitude of the thrust force produced by the thruster 50, can be greater or of lesser amount than that produced by the wedging action as desired. Referring to the FIGURES 3, 4, 5 and 6, the thruster 50 is of two parts, the first part is formed of a tubular section 18, through which extends the resilient rod means 19, with its end portions extending cantilever fashion beyond the ends of the tubular section 18; these rods 19 being of spring steel or the like. And the tubular section 18 includes a pair of wings 20 that have a pair of first slots 21. And the second part is formed of a pair of spaced apart flat plates 22, and spaced apart by the spacers 23, the spacing apart of the air of plates 22 a distance so as to permit of the first part slidably fitting therebetween. The spaced pair of plates 22 having a second pair of slots 24, intersecting the first pair of slots 21, but extending at an angle thereto. To operably connect the first part therewith the second part is by means of a pair pins 25, which extend through both the first and second pairs of slots (best seen at the enlarged section FIGURE 6). Then to provide of a fixed spacing of the pair of plates, and to provide a self-containment of the first and second parts, the pins 25 are shouldered and their ends riveted to the washers 26. A pair of bolting holes extend through the pair of plates 22, spacers 23 and washers 27, through which extends the bolting means 28. The FIGURE 3 shows a pair of bosses 115 as a part of the holder 102 which have internal screw threads, into which screw threads the bolting means 28, thereby securing fixedly the second half of the thruster 50 to this portion of the control means 48. At each side of the housing 42 are disposed the bosses 115', which are pipe tapped for the plugs 116. Externally the shank of these plugs 116 include screw threads that conform to the tapped holes within the bosses 115', and a portion of the shank of these plugs 116 are slotted as at 117, and externally the plugs 116 have a head 118 for application of a wrench. Then at right angle to the tapped screw threads therein the bosses 115' these bosses are tapped for the capscrews 119 or the like. The second part of the thruster 50 being secured fixedly onto the holder 102 as described, which also includes the tubular section 18 of the first part slidably connected thereto, whereupon the resilient rod means 19 is inserted through either of the tapped opening in the bosses 115' into and through the tubular section 18 so that the end portions extend cantilever fashion as already described, and the plugs 116 are screwed into the bosses 115' as shown at the FIGURES 3 and 4, whereupon the screws are screwed into these bosses so that in each instance the end bears upon end portion of the resilient rod means 19 thereby causes same to flex, which produces a thrust force upon the holder 102 in direction opposite to that produced by the wedging action of the V belt 85, due to the pins 25 forming an operable connection between the first and second parts of the thruster 50, in that the thrust forces produced by the flexing of the resilient rod means 19 acts upon the pins 25 through the edges of the first pair of slots in the wings 20 of the tubular section 18 and as these pins 25 extend also through the second pair of slots 24 in the plates 22 of the second part, this thrust force is transferred onto the edges of these slots 24 and through the bolting connection 28 onto the holder 102, resulting in any desired portion or whole of the thrust forces produced by the wedging action of the V belt being transferred onto the housing 42 through the thruster 50, independently of various surfaces of the control means 48.

The FIGURE 4 shows a plan view of the thruster 50 when the unit is adjusted to its low speed adjustment, FIGURE 1, and it will be noted that the pins 25 are toward one end of the pairs of slots 21 and 24, and for illustrative purposes let it be assumed that the unit has been adjusted to its high speed adjustment, FIGURE 2, and referring to the FIGURE 5, which show correspondingly change that occurred at the thruster 50, and it will be observed that the pins 25 are now toward the other end of the pairs of slots 21 and 24, all the while, the position of the first part of the thruster 50 remains alike in both instances; however, the second part of the thruster 50 moved axially with the holder 102 due to its being rigidly secured thereto by the bolting means 28. Operably this is brought about as follows, for as the second part of the thruster is caused to move axially, the edges of the first pair of slots causes the pins 25 to travel toward one another, sliding on the edges of both the first and second pairs of slots, which are well lubricated, as will be seen. Consequently, the predetermined amount or magnitude of the thrust forces of the thruster 50 remain substantially constant throughout entire range of speed adjustments of the unit. And lest it be thought that its thrust force when the unit is in the position corresponding to that of the FIGURE 4 causes the pins to slip in a direction to that illustrated at the FIGURE 5, such cannot occur for the operable connection between the control roller within the groove 17 solves such matters. Also the development anticipates that the internal portion of the plugs 116 be of a cone form thereby effect of the flexing of the resilient rod means 19 in place of the screws 119. Again referring to the FIGURE 5, which as described shows the position of the thruster 50 when the unit is adjusted to the high speed adjustment, and let it be assumed that the unit is being adjusted toward the low speed adjustment while in operation, which causes the holder 102 to move in a direction away from the resilient rod means 19, and to maintain the flexed position of the resilient rod means 19, include the lever means 137, which has a circular end 138 that fits into a corresponding circular recess within the seal adaptor 75, while the opposite end portion of the lever means 137 includes the faces 139 that rest onto faces of the spacers 23 and pins 25, so that upon the holder 102 moving away from the resilient rod means 19 causes the lever means 137 to rotate within the recess and simultaneously causes the pins 25 to move away from one another within the pair of slots 21, while sliding on the edges of the pair of slots 24. Thereby preventing of the pins 25 moving in a direction to cause substantial changes of the flexed position of the resilient rod means 19, or the predetermined amount of thrust forces of the thruster 50. The FIGURE 4 shows correspondingly the rotated position of the lever means 137, when the unit has been adjusted to the low speed position. During operation of the unit, the thrust forces produced by the wedging action of the V belt 85 act in a direction opposite to that produced by the thruster 50, both of which as heretofore described act through the pins 25, consequently the lever means 137 does not serve to transfer same onto the seal adaptor 75; they merely serve to cope with sliding friction matters between the edges of the pairs of slots and the respective pins therein.

The automatic continual lubrication system, generally indicated by the numeral 51, provides of a portion of the fluid lubricant 44 being transmitted to all of the metal-to-metal actuating surfaces within the inclosure 43 and those beyond an end of the housing 42 and the excess fluid so transmitted returned to the fluid lubricant pool within the inclosure. The FIGURE 1 shows a fluid lifter means 120 operably mounted on the driven shaft 93. And the lifter means 120 is mounted in adjacency to an end of the spline drive means 1, and the spacer 121, that extends from a side of the lifter 120 to a side of the bearing 79, of which the opposite end of the inner race abuts the snap ring 122, so that the fluid lifter means 120 and the shaft 93 rotate in unity. The lifter means 120 extends into the normal level of the pool formed by the fluid lubricant 44, so that operation of the shaft 93 causes a portion of the fluid 44 being thrown centrifugally above the normal level of the fluid pool in a continual manner. Which causes a fluid wetting of all the metal-to-metal-actuating surfaces within the inclosure, including a portion of the arms 54 and 55. For purposes of which the holes 123 through an upper wall of the bushings 83 are provided. The bore through the bushing is recessed for an O ring as at 124 and to retain the O ring is a flanged gland 125, which is suitably fastened to the boss 82 which fastening extends through the flange portion of the bushing 83 (the fastenings are not shown). And at the opposite end bosses 82, in similar manner, is fastened the blank flange 126. And at the lead screw 106 the bore in the bushings 105 are recessed for a similar O ring, all of which provides sealing of the fluid lubricant within the inclosure 43. And the control nut member 103 is provided with the hole 126' for supplying the fluid lubricant reaching the screw threads within the control nut member and the control roller 16. Also supplies lubricant onto the sliding surfaces between the edges of the pairs of slots and pins at the thruster 50. Then, further, the seal adaptor 75 includes a pair of pockets 127, shown in plan, FIGURE 11, each with an open top 128, best seen at the FIGURE 3, and on the horizontal center of the housing 42, these pockets 127 have the tapped apertures 129, shown at the FIGURE 11, into which is screw-threadingly connected the inclosed channel means 130, whose other end is screw threadingly connected to the end cap 131, which includes a hole that extends to form a continuance of the inclosed channel means 130, which terminates within the tubular shaft 93. Which provides that part of the lubricant fluid centrifugally thrown by the lifter means 120 drips into the pockets 127 through the open top 128, whence it flows out through the inclosed channel means 130 and spills into the tubular shaft 93. Where centrifugal forces take over and causes the fluid to hug the circumference of the bore 98, and travel therein and cause wetting of the racks and pinion; also part of this fluid passes through the pairs of slots 2 and 3, causing lubricant wetting of the drive means 1. Also that part of the fluid transverses through the notches 12 and return through the hole 132 to the fluid pool within the inclosure 43 for recirculation. The other tapped aperture 129 is blanked off by the flange ring 76 of the extension means, generally indicated by the numeral 52, and is employed in similar manner when the motor is disposed oppositely to that shown at the FIGURE 7, for the extension means 52 may be rotated one hundred and eighty degrees about the center of the housing 42 for such purposes. Part of the conveyed fluid also provides lubrication for the bearing 81, of which its outer race is anchored between the end cap 131 and the inner cap 133, while the inner race is anchored between a shaft shoulder and the snap ring 134, which prevents of any axial shifting of the shaft 93, and is similar to that shown by my aforesaid patent.

The seal adaptor 75 also supportably mounts a pair of projections 135 that are provided to prevent of any rotative movement of the holder 102, by their extending through the web 136, which is an integral part of the holder 102, best seen at the FIGURES 3 and 11.

In the prior art of variable speed transmissions of the present character, wherein of a pair of pulley structures are drivingly connected by a V belt, and in which one of the pulley structures has variable effective pitch diameter characteristics, while the pitch diameter of the other pulley structure is of fixed character, requires in addition to a multiplicity of pulleys three distinctly different types of bases, each having a different slidable platform to effect changes of the spacing between the motor which usually mounts the driver motor and the driver pulley structure.

The first type of base consists of a bulky base which has a slidable platform for mounting the driver motor which, in turn, mounts the variable effective diameter pulley that is connected by the V belt to the other pulley mounted on the drive shaft of the machinery being driven. This appeared to provide a simple drive arrangement, however in practice such is not the case, for to begin with the speed and the location of the machinery drive shaft relative to the floor or other foundation surface for mounting this base is an unknown factor at time of manufacture of the base. And since it is preferable that the relationship between the center of the driver motor on the base and the center of the driven pulley on the machinery drive shaft have a straight line relationship for minimum slide travel range. And to provide such relationship it is ordinarily found necessary to provide a sub-base structure. Then as to speed of the drive shaft of the machinery involves having on hand a multiplicity of different diameter pulley structures, and consequently a multiplicity of different length expensive endless V belts. And in practice, even when applying minimum size driven pulley structure and minimum length endless V belt, results in a bulky drive arrangement insofar as concerns necessary cubic installation space requirement.

Then to more conveniently provide of a straight line relationship between the driver motor and a driven pulley structure, the prior art provides a second type of base, consisting of a bulky base that of necessity requires more cubic space, as the included counter shaft means, onto one end of the counter shaft mounts the driven pulley structure, and in which the other end of the counter shaft provides of mounting desired transmission apparatus to drive the machinery drive shaft. This second type of base again involves a multiplicity of different diameter driven pulley structures and consequently a multiplicity of different length, expensive, endless V belts. And in practice, this second type of base with counter shaft means results in requiring considerably greater cubic installation space requirements than that of the above-mentioned first type, for the simple reason that the length of the base must be such so as to be capable of allowing the inclusion of the largest of the multiplicity of driven pulley structures.

The third type of base provided by the prior art consists of bulky base similar to the second type base, but in place of the counter shaft means, it provides of mounting thereon for an inclosed geared speed change unit, of which its input shaft mounts the driven pulley structure, and its output shaft being provided for mounting desired transmission apparatus to drive the machinery drive shaft. Which again appears to provide a logical solution; however, in practice this is not the case, for to begin with, the type or design of the geared unit is an unknown factor at time of manufacture of this third type base, which prohibits any possibility of including the fastening means between the base platform and the geared units base, which can only be safely performed after the geared unit and speed factors have been determined by the ultimate user, which involves a bothersome and costly matter. Also the ultimate selection of the geared unit involves matters of straight-line relationship between its input shaft and that of the motor output shaft, hence it is not even safely feasible to provide the mounting fastenings for the driver motor onto the slidable platform of the base at time of its manufacture, again presenting of bothersome and costly matters. Also this third type base drive results in a bulky drive arrangement similar to that of the above-mentioned second type.

Then further because of the multiplicity of different diameters of driven pulleys that must be manufactured and stocked, their face widths also vary, and the same applies to the multiplicities of different length expensive V belts that must be manufactured and stocked; their widths also vary in the prior art of variable speed transmissions of the present character.

The present invention, in a simple compacted manner, overcomes the aforementioned undesirable features of the prior art, for referring to the FIGURES 1 and 2, within the inclosure 43 the driven shaft 93 includes a coupler means, generally indicated by the numeral 29, for drivingly coupling thereto either a first gear of a gear train or a flanged couple half of a flanged couple means, and formed by a taper bore 30 with a like tapered split bushing 82 therein, and internally beyond the taper bore 30, the shaft 93 having internal screw threads 31 with the head portion of a stub shaft 32 having external screw threads threadingly connected thereto. And the tapered split bushing 82 has a straight bore with the shank 33 of the stub shaft 32 extending therethrough, and beyond the large end of the tapered split bushing 82, an end portion of the shank 33 having external screw threads with the lock nut means 34 threadingly connected thereon. Intermediate the large end of the tapered split bushing 82 and the lock nut means 34 a portion of the shank operably mounting either the first gear pinion 66 of a gear train, or the couple half 36 of a couple means, so that upon tightening up of the lock nut means 34 causes pressing of either the first gear pinion 66 or the couple half 36 against the large end of the tapered split bushing 82, and simultaneously press into the taper bore 30 of the tapered split bushing 82 and locking of the threaded connection between the internal screw threads 31 therewith the external screw threads on the head portion 32, and the straight bore in the tapered split bushing 82 grippping that portion of the shank 33 extending therethrough. A driving key 37, shown by means of dotted lines, forming a further holding and driving means between the respective structures. The FIGURE 1 shows the unit with gearing therein, the inclosure extending from the first pinion gear to the final gear that as hereinabove described is mounted onto the power takeoff shaft generally indicated by the numeral 46. And the FIGURE 2 which shows the very same unit as that of the FIGURE 1, but without the gear train, for the other flanged couple half 38 of the flanged couple means, which half is fastened to the flanged couple half 36 by means of the screw 39 or the like, and the flanged couple half 38 has the recess 40 therein for the lock nut means 34 and the power takeoff shaft 46 being suitably secured to the couple half 38 as by welding or the like not shown.

The present invention provides a variable speed transmission of the character involved, in a most compacted self-contained form, in that an individual unit providing entire means to cope with variable speed problems throughout both the high and low speed ranges. For instance, the unit as represented by the FIGURES 7, 8, 9 and 10, includes a housing that includes a mounting base for the entire unit, an inclosure with fluid lubricant therein for automatic continual lubrication of all the metal-to-metal actuating parts, the housing operably supports the extendible arms, which in turn support the driver motor with the driver pulley in a straight-line relation to the variable effective diameter pulley, which afford minimum space requirements between these shafts; also the housing operably mounts the speed control means, of which the actuator is disposed at a side well above the base, and finally the housing supports the variable speed power takeoff shaft, so that it is immaterial just where the drive shaft of the driven machinery happens to be. And with particular reference to the speed range of the power takeoff shaft, the present invention provides that it be driven from the shaft mounting the variable effective diameter pulley through speed change gearing within the inclosure, and thereby provide of coping with speed requirements in the very low speed ranges; also provides that it be driven directly therefrom, and thereby cope with speed requirements in the higher speed ranges. Both are accomplished without entailing of material changes or aspects of the unit.

All which eliminates entirely the objectionable features inherently involved in the prior art, that is, for each individual size drive having to manufacture and stock a whole series of bases having different aspects to one another, and having to manufacture and stock a multiplicity of different diameter driven pulleys with different width of faces, and consequently having to manufacture and stock a corresponding multiplicity of different lengths endless V belts. Also eliminate involvement of excessive cubic space installation requirements.

The present invention provides that only one of the sections of the variable effective diameter pulley be moved axially, instead of both sections, in which event the distance B, FIGURE 12, would be twice that when moving both sections; also that a wide section V belt be used, instead of the standard narrow section V belt shown.

Figure 16:
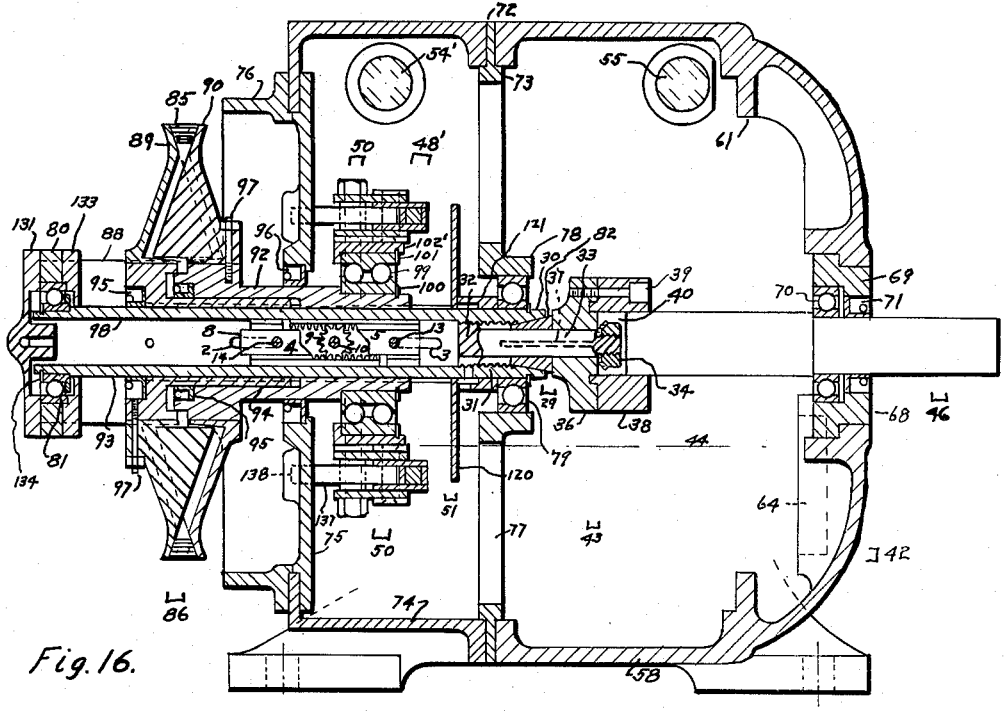
FIGURE 16 is an elevation side view like FIGURE 1 of a modified embodiment of my invention.
Figure 17:
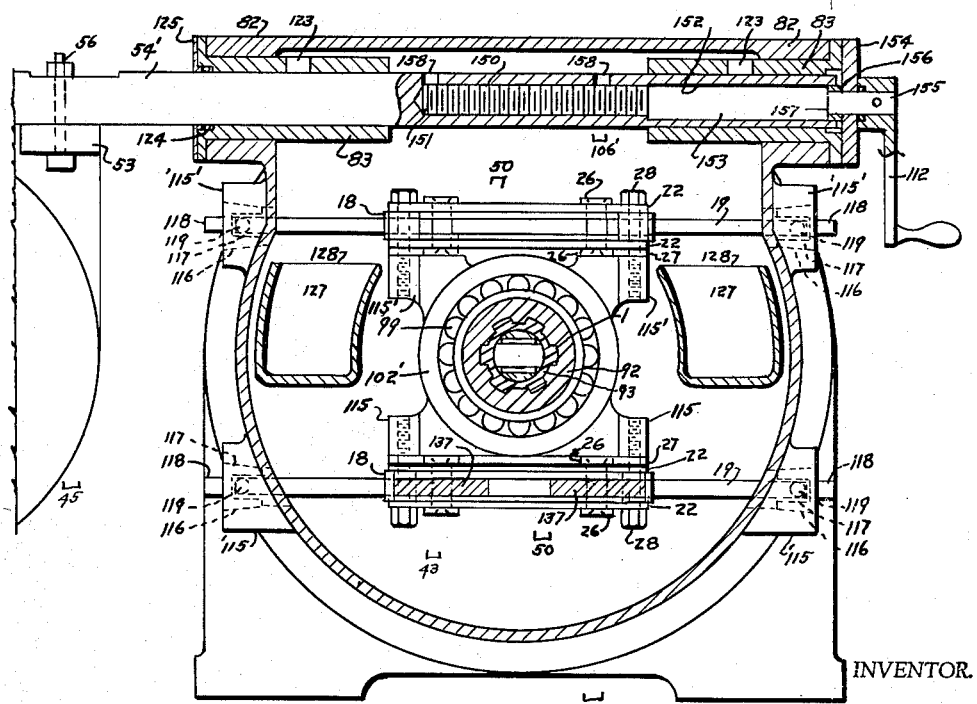
FIGURE 17 is an elevation cross-section like FIGURE 3 of the modified embodiment of my invention, FIGURE 16.

The FIGURES 16 and 17 show a modified form of the mechanical control means, generally indicated by the numeral 48', otherwise the unit is similar to that of the FIGURES 1 and 3 hereinabove described, and throughout applying the same numerals relative to parts that are similar to those of the FIGURES 1 and 2, and where they differ slightly, use the same numeral, but with a prime after the numeral. Referring to FIGURE 17, to provide a control nut, the arm 54' has internal screw threads 150, to which is screw threadingly connected the external screw threads on end portion 151 of the lead screw 106' and an end portion of the arm 54' has a bore 152 which provides a journaling for a shank portion 153 of the lead screw 106'. The arm 54' being slidable mounted by the bushings 83 (heretofore described), and suitably fastened to the housing boss 82 is a bearing plate 154 that includes a bore through which extends an end shank 155 of the lead screw 106' and the end portion of the shank 155 has pinned thereto the actuator 112. And in between a shoulder 157 at the lead screw and the inner face of the bearing plate 154 is a thrust washer 156. The shoulder 157 and the inner face of the hub of the actuator 112 serves to prevent of endwise movement of the lead screw 106', but allows of its being rotated, and which causes the drive motor 45 together with the drive pulley 87 to move toward or away from the housing as had been heretofore described concerning the unit FIGURES 3, 7, 9 and 10, for the modified control 48' does not change external aspects of the unit, other than the actuator 112 occurs at a higher level. Through the wall of the arm 54' are the holes 158, to permit of lubricant reaching the screw thread and journalling connection between the lead screw 106' and the arm 54', upon actuation of the automatic continual lubrication system heretofore dealt with.

Now referring to the FIGURE 16, to provide maintenance of the driving relationship of the V belt 85 therewith the respective pulleys 86 and 87, the control means 48' includes a pair of thrusters 50 (heretofore described) one being disposed and attached at an upper portion of the holder 102' and the other attached as heretofore at a lower portion, both of which provide thrust forces in direction opposite to that of the wedging action operably produced by the V belt. As the magnitude of the thrust force produced by the present thruster 50 remains substantially constant through entire range of speed adjustments of the unit, is of particular significance, for it provides a means whereby the capacity of the unit be rated equal to that if its driver motor through entire range of speed adjustments, without having to provide excessive pressures onto the edges of the V belt, as is inherently the case in the prior art, whereof they employ a coil spring means to produce a thrust force in direction opposite to that of said wedging action. Also in the prior art that employ a coil spring means at their variable effective diameter pulley structure, to remove and place an endless V belt requires the pounding in of a wedge block between the pulley sections, which is a bothersome matter. And which is unnecessary in the present invention as represented by the FIGURES 16 and 17, for referring to the FIGURES 4 and 5, the cap screws 119 are loosened sufficiently to remove the thrust forces produced by the thrusters 50, readily allows of spreading apart of the sections 89 and 90 for removal and placement of the endless V belt 85, and after the V belt has been placed within the grooves of the respective pulleys, the screws 119 are retightened.

I claim:

1. In a variable speed transmission in a housing with an end extension, the outward end of said extension carrying a first bearing, a second bearing within said housing, a shaft operably mounting a variable effective diameter V groove pulley intermediate of said first and second bearing, rectangular to the axis of said shaft the housing mounting a pair of arms, each having an end portion within said housing, with their opposite end portion extendible projecting therefrom, and operably mounting a driver motor in alignment to said axis adjustably beyond said housing, said motor having a power output shaft mounting a V grooved pulley, an endless V belt in driving relationship to said grooved pulley and the effective diameter of said variable pulley, mechanical control means to cause adjustment of the effective diameter of said variable pulley, said control means operably connected to at least one of said arms so that upon causing said adjustment simultaneously causing a correlative change of the extensibility of said arms and spacing between said shafts while maintaining said driving relationship, a longitudinal portion of said extension disposed within the inner circumference of said V belt, a power takeoff shaft operably connected to said shaft, and said housing provided with base members for operably supporting said variable speed transmission.

2. The invention according to claim 1, wherein internally in adjacency to the output end said housing being provided for mounting a spider, and the shaft being of tubular form and internally the inner end portion within the housing operably mounting an adjustable coupler means, for a first gear pinion of a speed change gearing, said first gear pinion being disposed in adjacency to said inner end, and of the speed change gearing the final gear within the housing mounts onto the inside end portion of said power takeoff shaft intermediate of said spider and said output end.

3. The invention according to claim 1, wherein the shaft is of tubular form and the housing provides an inclosure, a fluid lubricant within said inclosure, at least one wall of said inclosure including pocket means having an open top above the normal level of said fluid, with an aperture below said top, said aperture connecting to an inclosed channel means that extends to the outward end of said shaft, by a portion extending intermediate said shaft, motor and V-loop, an end portion of said shaft within the inclosure having a return passage and operably mounting a fluid lifter means that extends into said fluid so that upon operation of the shaft causes part of said fluid being thrown centrifugally above said level to cause a portion dripping into said pocket means through the open top, whence flowing through said channel means into said shaft and provide lubrication of the metal to metal actuating parts of said variable effective diameter pulley structure, the excess fluid returning for recirculation through said return means, and simultaneously said fluid part provides lubricant wetting of portions of the control means, arms, bearings and other metal to metal actuating parts within said inclosure.

4. The invention according to claim 1, wherein an opposite pair of the housing side walls mounts fixedly a socket means, into which extends opposite ends of a thruster means, said thruster means providing a thrust force of substantially constant amount throughout said adjustment in direction opposite to that of the operative wedging action of said V belt, and is formed of a first part of tubular section through which extends a resilient rod means, said tubular section including wings having a first pair of slots, and a second part formed of a pair of plates spaced apart so that said first part slidably fit therein, said pair of plates having a second pair of slots intersecting said first pair of slots but, extending at an angle thereto, a pair of pins extending through said first and second pairs of slots forming, an operable connection for transferring said thrust force from the side walls of said first pair of slots onto the side walls of said second pair of slots, said thrust force being provided by opposite end of said resilient rod means extending into said socket means in flexed position and said second part being rigidly fastened to a portion of said control means, so that upon movement parallel to said axis of said portion the edges of said first pair of slots causes said pair of pins to move transversely to said movement, while simultaneously sliding along the edges of said second pair of slots, substantially without changing the magnitude of said flexed position of said resilient rod means and amount of said thruster force.

5. The invention according to claim 4, wherein the thruster means includes means at the external sides of the housing to provide desired amount of said flexed position.

6. The invention according to claim 1, wherein the mechanical control means includes a nut member having a groove means into which rides a roller, controlling the effective diameter of the variable V groove pulley, said groove means being in the form of an arc of a true circle, of which the pitch diameter of said arc is formed by constructing a right triangle, of which the first side is equal to the length and direction of the total difference between the change spacing required between center of the shaft and motor output shaft, and the second side of said triangle is equal to the length of the axial movement change required between the large and small effective diameters of the variable diameter pulley, and of which the third side, the hypotenuse, constitutes the length of said arc, and in which the difference between one-half the length of the second side and the axial movement distance when adjusting from the small to mid effective diameter provides the third point for computing said pitch diameter of said arc.

7. The invention according to claim 6, wherein the housing having an opening at the top for insertion and removal of the nut member, and said opening being provided with a removal cover fixedly attached to said housing top.

8. In a variable speed transmission a housing with an end extension, the outward end of said extension carrying a first bearing, a second bearing within said housing, a shaft operably mounting a variable effective diameter V groove pulley intermediate of said first and second bearing, rectangular to the axis of said shaft the housing mounting a pair of arms each having an end portion within the housing, with their opposite end portion extendible projecting therefrom, and operably mounting a driver motor in alignment to said axis adjustably beyond said housing, said motor having a power output shaft mounting a V grooved pulley, an endless V belt in driving relationship to said V grooved pulley and the effective diameter of said variable pulley, mechanical control means to cause adjustment of the effective diameter of said variable pulley, said mechanical control means operably connected to at least one of said arms so that upon causing said adjustment simultaneously causes extensibility of said arms and thereby change the spacing between said shaft and said motor while maintaining said driving relationship, by an opposite pair of the housing side walls mounting fixedly a socket means, into which extends opposite ends of a thruster means, said thruster means providing a thrust force of substantially constant amount throughout said adjustment, in direction opposite to that of the operation wedging action of said V belt, and is formed of a first part of tubular section through which extends a resilient rod means, said tubular section including wings having a first pair of slots, and a second part formed of a pair of plates spaced apart so that said first part slidably fit therein, said pair of plates having a second pair of slots intersecting said first pair of slots but, extending at an angle thereto, a pair of pins extending through said first and second pairs of slots forming, an operable connection for transferring said thrust force from the side walls of said first pair of slots onto the side walls of said second pair of slots, said thrust force being provided by opposite end of said resilient rod means extending into said socket means in flexed position and said second part being rigidly fastened to a portion of said control means, so that upon movement parallel to said axis of said portion the edges of said first pair of slots causes said pair of pins to move transversely to said movement, while simultaneously sliding along the edges of said second pair of slots, substantially without changing the magnitude of said flexed position of said resilient rod means and amount of said thruster force.

9. The invention according to claim 8, wherein the housing provides a fluid inclosure, a fluid lubricant within said inclosure, within said inclosure said shaft operably mounting a fluid lifter means that extends into said fluid, so that upon operation of said shaft causes part of said fluid being thrown centrifugally above the normal level to cause lubricant wetting of the metal to metal actuating portions of the control means, arms, bearings and thruster means within said inclosure.

10. The invention according to claim 8, wherein the shaft is of tubular form and the housing provides a fluid inclosure, at least one wall of said inclosure including pocket means having an open top above the normal level of said fluid, with an aperture below said top, said aperture connecting to an inclosed channel means that extends to the outward end of said shaft, by a portion extending intermediate said shaft, motor and V-belt loop, an end portion of said shaft within the inclosure having a return passage and operably mounting a fluid lifter means that extends into said fluid so that upon operation of the shaft causes part of said fluid being thrown centrifugally above said level to cause a portion dripping into said pocket means through the open top, whence flowing through said channel means into said shaft and provide lubrication of the metal to metal actuating parts of said variable effective diameter pulley structure, the excess fluid returning for recirculation through said return means, and simultaneously said fluid part providing lubricant wetting of portions of the control means, arms, bearings and thruster means within said inclosure.

11. In a variable speed transmission, a housing operably mounting a driven shaft, a power takeoff, a means having an adjustable reach, each having a portion within the housing, and said means adapted for supporting a driver motor with a drive pulley on its output shaft a selective distance from the housing and driven shaft, a variable diameter pulley formed of a pair of sections having opposed inclined belt engaging faces on the driven shaft and forming, by relative axial adjustment variable effective diameter, for an endless V-belt in active driving relationship thereto and the drive pulley, mechanical control means adapted to cause the axial adjustment and engaging said means to simultaneously cause correlative adjusting of said distance to provide, for maintaining said active driving relationship when varying the effective diameter and power takeoff speed, the housing having base means for mounting the transmission.

12. The invention according to claim 11, wherein a portion of the control means and hub end of the variable pulley being within the housing.

References Cited by the Examiner

UNITED STATES PATENTS

| | | | |
|---|---|---|---|
| 1,814,311 | 7/31 | Harvey | 74—421 |
| 1,836,225 | 12/31 | Christensen | 74—421 |
| 2,678,460 | 5/54 | Oishei | 64—4 |
| 2,871,715 | 2/59 | Rieser. | |
| 2,930,448 | 3/60 | Burnham | 184—11 |
| 2,970,493 | 2/61 | Rieser. | |
| 2,996,148 | 8/61 | Behnke et al. | 184—11 |

DON A. WAITE, *Primary Examiner.*

BROUGHTON G. DURHAM, *Examiner.*